US010810638B2

(12) United States Patent
Yeung

(10) Patent No.: US 10,810,638 B2
(45) Date of Patent: Oct. 20, 2020

(54) NETWORK BASED PLATFORM STRUCTURE FOR COLLECTING USER ACTIVITY DATA AND CAPITALIZING USER ACTIVITIES

(71) Applicant: Benjamin Yeung, Pasadena, CA (US)

(72) Inventor: Benjamin Yeung, Pasadena, CA (US)

( * ) Notice: Subject to any disclaimer, the term of this patent is extended or adjusted under 35 U.S.C. 154(b) by 444 days.

(21) Appl. No.: 15/632,828

(22) Filed: Jun. 26, 2017

(65) Prior Publication Data

US 2017/0372385 A1 Dec. 28, 2017

Related U.S. Application Data

(60) Provisional application No. 62/354,331, filed on Jun. 24, 2016.

(51) Int. Cl.
| | |
|---|---|
| *G06Q 30/06* | (2012.01) |
| *G06Q 30/02* | (2012.01) |
| *G07C 5/00* | (2006.01) |
| *G07C 5/02* | (2006.01) |
| *G06Q 30/04* | (2012.01) |
| *G07C 5/08* | (2006.01) |

(52) U.S. Cl.
CPC ......... *G06Q 30/0283* (2013.01); *G07C 5/008* (2013.01); *G07C 5/02* (2013.01); *G06Q 30/04* (2013.01); *G07C 5/085* (2013.01)

(58) Field of Classification Search
CPC ........... G06Q 30/0601; G06Q 30/0283; G06Q 30/04; G07C 5/02; G07C 5/008; G07C 5/085
USPC ....................................................... 705/26.1
See application file for complete search history.

(56) References Cited

U.S. PATENT DOCUMENTS

| | | | | |
|---|---|---|---|---|
| 7,647,253 B1 * | 1/2010 | Yeung | ................... | G06Q 20/12 705/1.1 |
| 7,657,464 B1 * | 2/2010 | Yeung | ................. | G06Q 30/018 705/26.1 |

OTHER PUBLICATIONS

IDreamSky Reports Fourth Quarter and Fiscal Year 2014 Unaudited Financial Results iDreamSky reports fourth quarter and fiscal year 2014 unaudited financial results. (Mar. 23, 2015). NASDAQ OMX's News Release Distribution Channel Retrieved from http://dialog. proquest.com/professional/docview/1665482451?accountid=1.*
2010-F05819, May 2010, Derwent, Yeung.*

* cited by examiner

*Primary Examiner* — Yogesh C Garg
(74) *Attorney, Agent, or Firm* — Locke Lord LLP; Tim Tingkang Xia, Esq.

(57) ABSTRACT

In an aspect of the disclosure, a method, a computer-readable medium, and a network based platform. A platform entity of the network based platform receives, from a first group entity managing a group of vehicles, data of projected payments that are to be generated based on transportation activities of the group of vehicles. The platform entity determines an amount of convertible preferred shares of a business entity to be issued to the group of vehicles based on the projected payments. Further, another platform entity of the network based platform receives, from a first group entity managing a group of housing units, data of projected payments that are to be generated based on household activities of the group of housing units. The platform entity determines an amount of convertible preferred shares of a business entity to be issued to the group of housing units based on the projected payments.

9 Claims, 10 Drawing Sheets

| YEAR $i=1$ | 0 | 1 | 2 | 3 | 4 | 5 | 6 | 7 | 8 | 9 | 10 |
|---|---|---|---|---|---|---|---|---|---|---|---|
| $E_i$ | 0 | $300M | | | | | | | | | |
| $\Delta E_i$ | 0 | $300M | | | | | | | | | |
| $PE_i$ | 15 | 15 | 50 | 20 | 30 | 40 | 25 | 25 | 35 | 40 | 40 |
| $SP_i$ | | $45 | | | | | | | | | |
| $N_{i,i}$ (shares) | | 66.67M | | | | | | | | | |
| $q_i$ | | .20 | .15 | .10 | .10 | .10 | .10 | .10 | .05 | .05 | .05 |
| $N_{i,i} \times q_i$ | | 13.33M | 10.00M | 6.67M | 6.67M | 6.67M | 6.67M | 6.67M | 3.34M | 3.34M | 3.34M |
| $\sum_{k=1}^{i} \Delta E_k / SP_k$ | 0 | 13.33M | | | | | | | | | |
| $z_i^c$ | 0 | 13.33M | | | | | | | | | |
| $z_i$ | 100M | 113.33M | | | | | | | | | |

FIG. 4

| item | 0 | 1 | 2 | 3 | 4 | 5 | 6 | 7 | 8 | 9 | (L=)10 |
|---|---|---|---|---|---|---|---|---|---|---|---|
| $E_i$ | 0 | 300 | 600 | 1200 | 2400 | 4800 | 9600 | 19,200 | 38,400 | 76,800 | 153,600 |
| $\Delta E_i$ ($M) | 0 | 300 | 300 | 600 | 1200 | 2400 | 4800 | 9600 | 19,200 | 38,400 | 76,800 |
| $PE_i$ | 15 | 15 | 50 | 20 | 30 | 40 | 25 | 28 | 35 | 40 | 48 |
| $SP_i$ | | $45 | $265 | ... | ... | ... | ... | ... | ... | ... | ... |
| $N_{cs}$ (shares) | | 66.67M | 66.67M | ... | ... | ... | ... | ... | ... | ... | ... |
| $\alpha_i$ | .15 | .20 | .15 | .10 | .10 | .10 | .10 | .10 | .05 | .05 | .05 |
| $\Sigma_{k=1}^{i} N_{cs}(k)\, \alpha_{i+1-k}$ | | 13.33M | 14.53M | ... | ... | ... | ... | ... | ... | ... | ... |
| $C_0 \Sigma_{k=1}^{i} \Delta E_k / SP_i$ | 0 | 13.33M | 4.52M | ... | ... | ... | ... | ... | ... | ... | ... |
| $N_{rs}^t$ | 0 | 13.33M | 4.52M | ... | ... | ... | ... | ... | ... | ... | ... |
| $N_t$ | 100M | 113.33M | 117.85M | ... | ... | ... | ... | ... | ... | ... | ... |

500

NETWORK BASED PLATFORM STRUCTURE FOR COLLECTING USER ACTIVITY DATA AND CAPITALIZING USER ACTIVITIES

CROSS-REFERENCE TO RELATED APPLICATION(S)

This application claims the benefit of U.S. Provisional Application Ser. No. 62/354,331, entitled "NETWORK BASED PLATFORM STRUCTURE FOR COLLECTING USER ACTIVITY DATA AND CAPITALIZING USER ACTIVITIES" and filed on Jun. 24, 2016, which is expressly incorporated by reference herein in its entirety.

BACKGROUND

Field

The present disclosure relates generally to a network based platform structure, and more particularly, to a network based platform structure for collecting user activity data and capitalizing user activities.

Background

With the development of Internet-of-things, all human daily activities can be captured to generate activity data. Such activity data can be further activated and deep mined to generate economically valuable information. The business process of collecting the activity data can create business profits, which can be further increased on the capital markets. As such, the advanced technology development may truly benefit people. As such, there is a need for a network based platform that releases the potential economic value of daily consumption activities of individuals.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a network based platform. A platform entity of the network based platform receives, from a first group entity managing a group of vehicles, data of projected payments that are to be generated based on transportation activities of the group of vehicles. The platform entity also receives actual transportation activities generated from the group of vehicles. The payments received by platform entity are revenues of a public company. The platform entity determines an amount of convertible preferred shares of the public company to be issued to the group of vehicles based on the projected payments. The first group entity receives, from the group of vehicles, data specifying respective transportation activities of each vehicle of the group of vehicles. The data are generated from the vehicles in real time. The first group entity obtains a monetary value of each of the transportation activities. The monetary value is calculated based on the data specifying the each transportation activity. The first group entity requests a payment of the monetary value for each of the transportation activities of the group of vehicles. The first group entity determines a respective portion of the convertible preferred shares to be allocated to each vehicle of the group of vehicles based on payments made for that each vehicle.

Further, another platform entity of the network based platform receives, from a first group entity managing a group of housing units, data of projected payments that are to be generated based on household activities of the group of housing units. The platform entity also receives actual household activities generated from the group of housing units. The payments received by platform entity are revenues of a public company. The platform entity determines an amount of convertible preferred shares of the public company to be issued to the group of housing units based on the projected payments. The first group entity receives, from the group of housing units, data specifying respective household activities of each housing unit of the group of housing units. The data are generated on the housing units in real time. The first group entity obtains a monetary value of each of the household activities. The monetary value is calculated based on the data specifying the each household activity. The first group entity requests a payment of the monetary value for each of the household activities of the group of housing units. The first group entity determines a respective portion of the convertible preferred shares to be allocated to each housing unit of the group of housing units based on payments made for that each housing unit.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a table illustrating conversion of convertible preferred shares of a public company to common shares.

DETAILED DESCRIPTION

Figure 1:
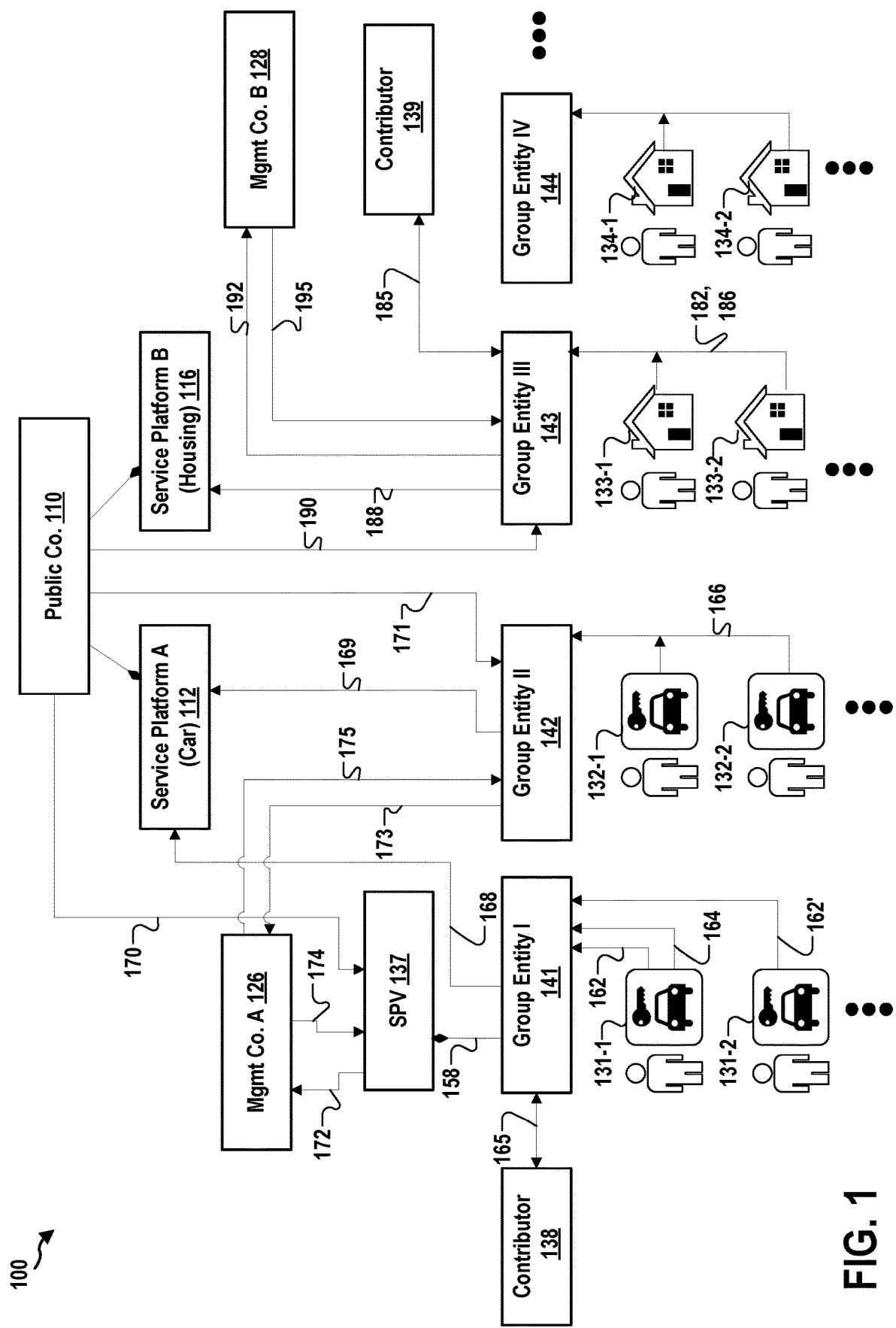
FIG. 1 is a diagram illustrating a network based platform structure that collects user activity data and capitalizes user activities.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

With the development of Internet-of-things, all human daily activities can be captured to generate activity data. Such activity data can be further activated and deep mined to generate economically valuable information. The business process of collecting the activity data can create business profits, which can be further increased on the capital markets. As such, the advanced technology development may truly benefit people. For example, the potential economic value of daily consumption activities of individuals can be released through a network based platform through an active mode or a passive mode as described infra.

FIG. 1 is a diagram 100 illustrating a network based platform structure that collects user activity data and capitalizes user activities. A public company 110, which is traded in one or more of stock markets, owns or controls a service platform A 112. The service platform A 112 may own or control one or more group entities such as a group entity 141 and a group entity 142. Each of the group entities may be associated with a group of vehicles or a group of housing units. Each of the group entities may own a special purpose vehicle (SPV) entity.

In this example, the group entity 141 owns an SPV entity 137. As described infra, the group entity 141 is associated with, and receives payments and user data from, a first group of vehicles 131. Although the present disclosure describes that a vehicle transfers payments to the group entity, it should be appreciated that it is a user, an owner, or a contributor of the vehicle who pays the group entity. The group entity 141 transfers the payments and user data to the service platform A 112. The payments are considered as the revenue of the service platform A 112. In return, the SPV entity 137 receives certain shares of the public company 110.

Similarly, the group entity 142 is associated with, and receives payments and user data from, a second group of vehicles 132. The group entity 142 transfers the payments and user data to the service platform A 112. In return, the group entity 142 receives certain shares of the public company 110. Further, the group entity 141 and the group entity 142 may contract a management company A 126 to manage their respective shares received from the public company 110.

Further, the service platform B 116 may own or control one or more group entities such as a group entity 143 and a group entity 144. As described infra, the group entity 143 is associated with, and receives payments and user data from, a first group of housing units 133. The group entity 144 is associated with, and receives payments and user data from, a second group of housing units 134. Although the present disclosure describes that a housing unit transfers payments to the group entity, it should be appreciated that it is a user, an owner, or a contributor of the housing unit who pays the group entity.

The group entity 143 and the group entity 144 transfer the payments and user data to the service platform B 116. The payments are considered as the revenue of the service platform B 116. In return, the group entity 143 and the group entity 144 receive certain shares of the public company 110. Further, the group entity 143 and the group entity 144 may contract a management company B 128 to manage their respective shares received from the public company 110. In another configuration, the group entity 143 and/or the group entity 144 may utilize a SPV entity as the group entity 141.

In this example, the service platform A 112 is specialized in managing user transportation activities and obtaining associated transportation activities data. As shown, the first group of vehicles 131 may include a predetermined number (e.g., 100, 500, 1000) of vehicles such as vehicles 131-1, 131-2, et al. The first group of vehicles 131 may be selected based on one or more rules or may be selected randomly. The first group of vehicles 131 each may be owned by, leases to, or otherwise made available to a user. For example, the user of the vehicle 131-1 may drive the vehicle 131-1 to travel from a location A to a location B.

The first group of vehicles 131 may join, be associated with, and be managed by the group entity 141. Further, as described supra, the group entity 141 may, at operation 158, set up the SPV entity 137. The group entity 141 owns and controls the SPV entity 137. For example, the group entity 141 may own 100% of the shares of the SPV entity 137.

Each vehicle of the first group of vehicles 131 may be equipped with a measurement device. The measurement device may determine a monetary value of an activity of a user driving the vehicle, which carries himself or herself, from a location A to a location B. That is, in this example, the measurement device may determine a monetary value for the service that the user provided to himself or herself by driving the vehicle to transport himself or herself from the location A to the location B. The measurement device may receive parameters, e.g., from the group entity 141, based on which the monetary value is determined. For example, with respect to the vehicle 131-1, the parameters received by the associated measurement device may indicate price information (e.g., X dollar/mile) for different types of cars (e.g., TOYOTA and LEXUS) at different times (e.g., rush hours and regular hours) of the day.

Figure 2:
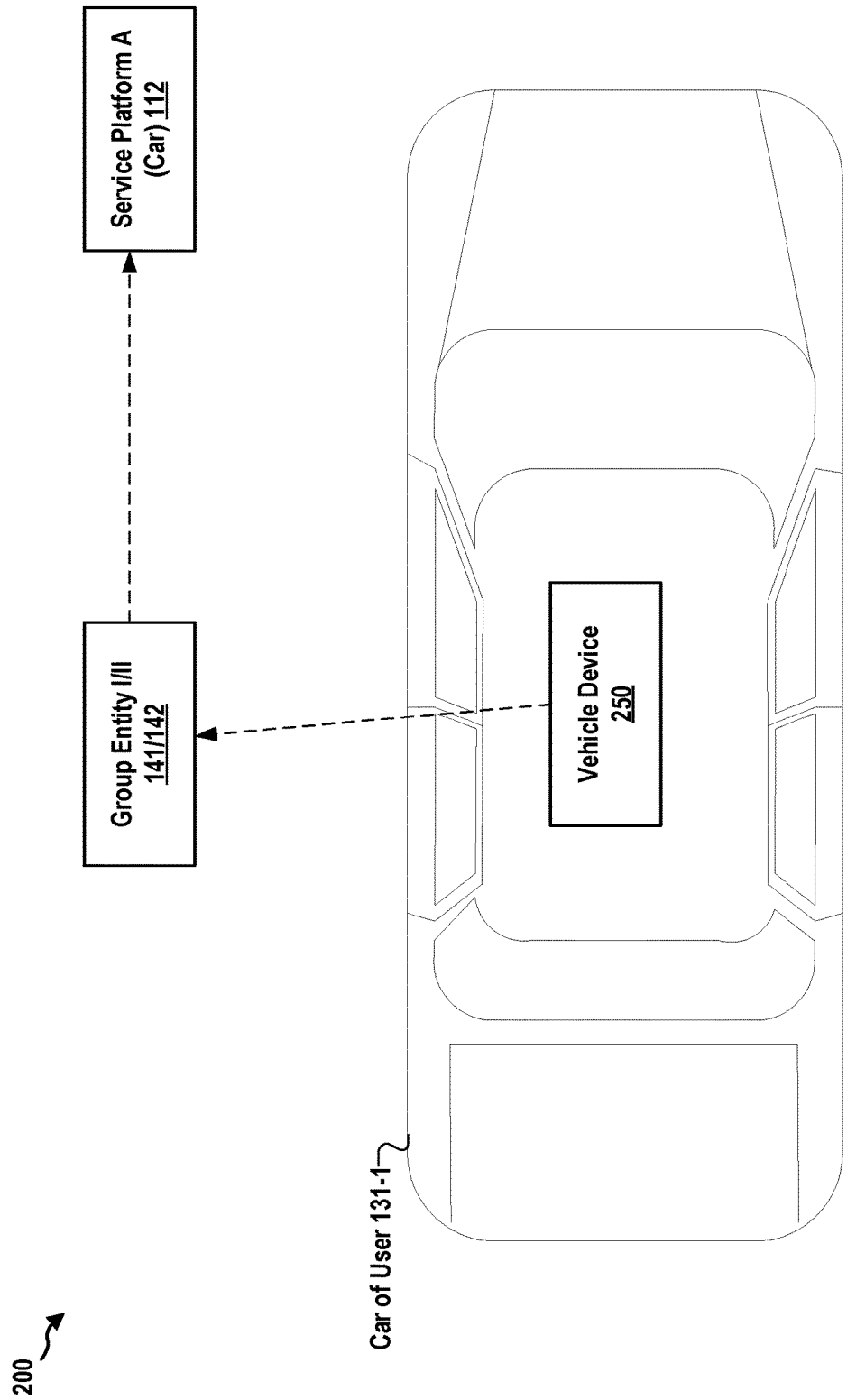
FIG. 2 shows an exemplary configuration of a platform user's vehicle.

FIG. 2 shows an exemplary configuration of a vehicle described supra. Of course there are other configurations. The vehicle is equipped with a vehicle device 250. For example, the vehicle device 250 may monitor the mileage of the vehicle and determine the monetary value and consumption data regarding usage of the tires and engine of the vehicle. Those data are reported to a group entity (e.g., the group entity 141 or the group entity 142), which then sends the data to the service platform A 112.

Figure 3:
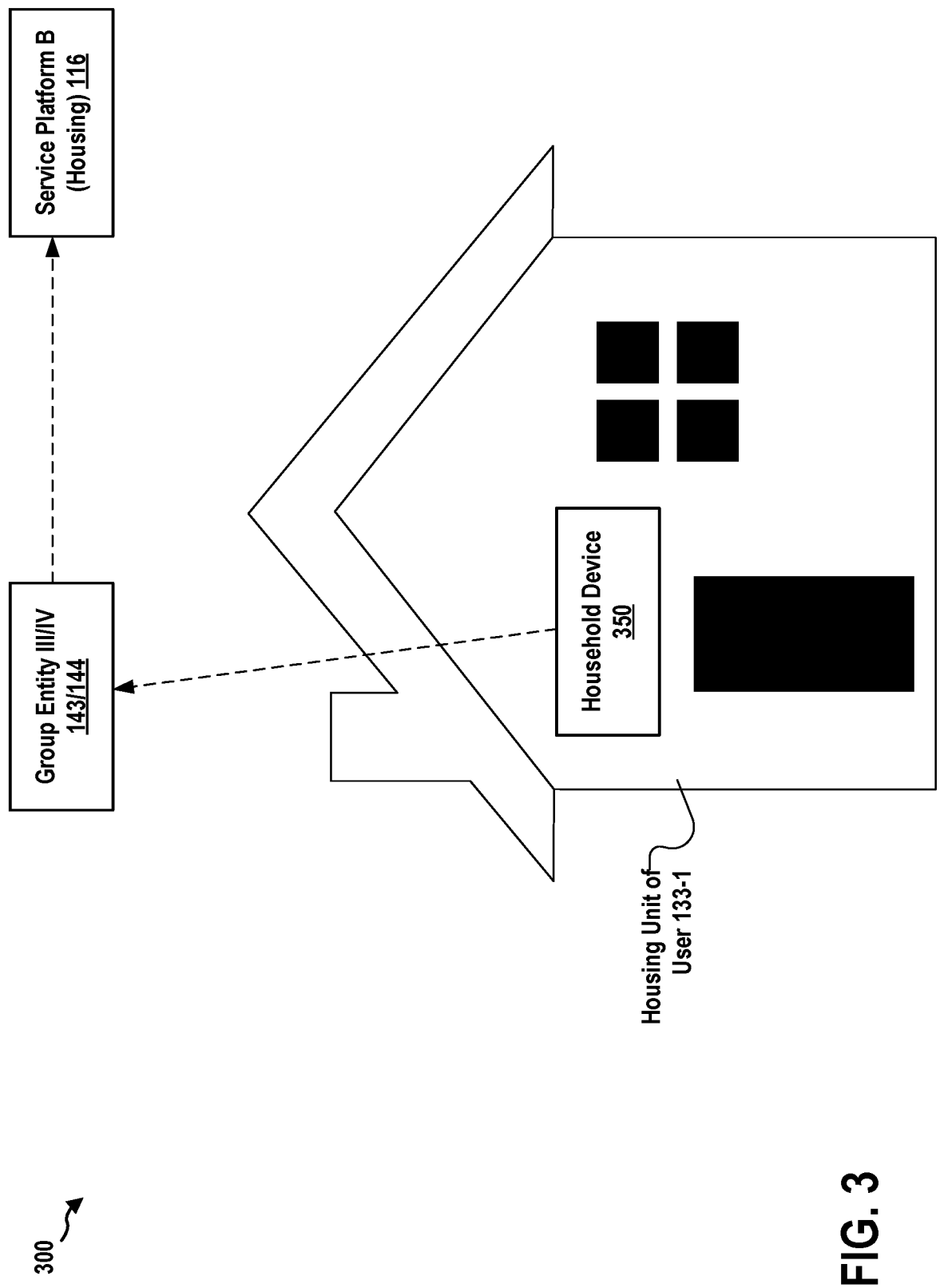
FIG. 3 shows an exemplary configuration of a platform user's housing unit.

FIG. 3 shows an exemplary configuration of a housing unit described supra. Of course there are other configurations. The housing unit is equipped with a household device 350. For example, the household device 350 may determine the monetary value and consumption data regarding usage of solar panels, bathroom facilities, Internet service, water, etc. Those data are reported to a group entity (e.g., the group entity 143 or the group entity 144), which then sends the data to the service platform B 116.

In one configuration, the vehicle device 250 of a vehicle (e.g., the vehicle 131-1), may, at operation 162, report to the group entity 141 the monetary value data of a particular transportation activity of the vehicle. In one configuration, the vehicle device 250 is configured with a particular algorithm for calculating the monetary value of a transportation activity. The algorithm is formulated at the service platform A 112 and then transferred to the group entity 141. The vehicle device 250 of the vehicle then obtains the algorithm from the group entity 141. In one example, the vehicle device 250, implementing algorithm, uses the start and end locations of a trip of the vehicle to calculate the distance of the trip. Then the vehicle device 250 multiplies the distance with a value per unit distance (e.g., 1 USD per mile) to obtain a monetary value of the transportation activity of the trip.

More specifically, in this example, the vehicle device 250 of the vehicle 131-1 detects that the first vehicle has been started. The vehicle device 250 may be in communication with the ignition device of the vehicle 131-1 and receives a signal from the ignition device upon the user ignites the vehicle 131-1. The signal indicates to the vehicle device 250 that the vehicle 131-1 has initiated. The vehicle device 250 may be equipment with a global navigation satellite system (GNSS) receiver. Upon receiving the signal from the ignition device, the GNSS receiver takes a measurement the GNSS signals (e.g., GPS signals). In one configuration, the vehicle device 250 can determine the start location of the vehicle 131-1 based on the information contained in the GNSS signals.

Further, after the user has shut off the engine of the vehicle 131-1, the control device of the vehicle 131-1 sends another signal to the vehicle device 250. The signal indicates to the vehicle device 250 that the vehicle 131-1 has been has been shut off. Upon receiving the signal from the control device, the GNSS receiver takes another measurement the GNSS signals. In one configuration, the vehicle device 250 can determine the end location of the vehicle 131-1 based on the information contained in the GNSS signals. As described supra, using the start and end locations, the vehicle device 250 can calculate the monetary value service of the user for driving himself/herself from the start location to the end location. Subsequently, the vehicle device 250 can data specifying the monetary value to the service platform A 112.

In another configuration, the vehicle device 250 of the vehicle may not calculate the monetary value of a transportation activity. Rather, the vehicle device 250 may send transportation activity data of the user to the group entity 141. The group entity 141 may determine the monetary value of the transportation activity based on the received transportation activity data of the user. The transportation activity data may indicate the starting location, the destination, the user demographic, etc. In one example, the vehicle device 250 can transmit the data contained in the GNSS signals (e.g., timestamps) to the group entity 141. The group entity 141 can accordingly determines the start and end locations of the trip made by the vehicle 131-1 and, thus, of the distance of the trip made by the vehicle 131-1. The group entity 141 can further calculate the monetary value based on the algorithm.

In certain configurations, the vehicle device 250 in a vehicle may monitor the mileage of the vehicle and determine the monetary value and consumption data regarding usage of the tires and engine of the vehicle. Those data are reported to the service platform A 112.

Further, in certain configurations, the vehicle device 250 may be equipped with a cellular communication component for communication with base stations of a telecommunication network. The vehicle device 250 may communicate with the base stations in accordance with Long-Term Evolution (LTE) standards. In particular, the vehicle device 250 may be in compliant with the LTE Machine-Type Communications (MTC) specifications and may communicate with the base stations on MTC channels. The vehicle device 250 may also be equipped with a WIFI communication component and may communicate with a WIFI access point in accordance with IEEE 802.11 standards. As such, the vehicle device 250 may scan the channels (e.g., periodically) to acquire a channel in order to establish a connection with a base station or an WIFI access point. Once a channel is established, the vehicle device 250 uses that channel to transmits transportation activity data and/or monetary value data to the service platform A 112.

In certain configurations, the vehicle device 250 of a vehicle may detect operation conditions of the vehicle in accordance with a predetermined schedule (e.g., constantly or periodically). The vehicle device 250 may record data specifying the operation conditions in a storage device of the vehicle. For example, the data may specify a detailed route of a trip (e.g., the location of the vehicle every 5, 10, 20, or 40 seconds etc.) and the driving speed of the user during the trip (e.g., every 5, 10, 20, or 40 seconds etc.). In certain configurations, the vehicle device 250 can transmit the operation condition data to the group entity 141 on a channel established as described supra.

In certain configurations, the algorithm for determining the monetary value of a transportation activity utilizes the operation condition data. For example, the vehicle device 250 of a vehicle or the group entity 141 can accordingly calculate the vehicle device 250 based on the trip mileage and speed/wait time of the vehicle (e.g., the rate for every minute when the vehicle is traveling under 25 miles/hour is $1/minute or any other suitable rate).

Referring back to FIG. 1, in certain circumstances, a user of a particular vehicle may choose to enroll the service provided by the service platform A 112 through a group entity in an active mode. Using the vehicle 131-1 as an example, when in the active mode, after a transportation activity of the vehicle is completed and its monetary value data are obtained at the group entity 141 in operation 162, the group entity 141 may send a payment request to the user of the vehicle. For example, the group entity 141 may send a request message (e.g., a Short Message Service (SMS) message) to the vehicle device 250 and another other devices (e.g., smart phone) of the user. The user may make payments to the group entity 141 accordingly. In certain configurations, the user may configure the vehicle device 250 to make payments automatically. For example, the vehicle device 250, upon receiving the payment request, may use the channel established as described supra to communicate with a financial institute (e.g., a bank) and requests the financial institute to transfer fund from the user's account to the group entity 141. In this example, the vehicle 131-1, at operation 164, transfers a payment of the monetary value to the group entity 141. Those payments and transportation activities are then transferred to the service platform A 112 by the group entity 141. As described infra, in return, the group entity 141 or the SPV entity 137 will receive convertible preferred shares of the public company 110. The group entity 141 or the SPV entity 137 may convert the convertible preferred shares to common shares and, then, sell the common shares on the market. A portion of the proceeds (e.g., determined based on the payments made by the vehicle 131-1) will be distributed to the vehicle 131-1 (or its user). The distribution is potentially worth more than the payments made by the vehicle 131-1.

In certain circumstances, a user may choose to enroll in a passive mode. In the passive mode, a user does not make payments to the group entity 141. Rather, a contributor 138, which is contracted by the user, will make payments of the monetary value of each transportation activity of the user. Those payments and transportation activities are then transferred to the service platform A 112 by the group entity 141. As described infra, in return, the group entity 141 or the SPV entity 137 will receive convertible preferred shares of the public company 110. The group entity 141 or the SPV entity 137 may convert the convertible preferred shares to common shares and, then, sell the common shares on the market. A portion of the proceeds (e.g., determined based on the payments made by the contributor 138) will be distributed to the contributor 138. The distribution is potentially worth more than the payments made by the contributor 138. The contributor 138 may further agree to pay back a portion of the received proceeds to the vehicle 131-1 or its user. In particular, when in the passive mode, after a transportation activity is completed and its monetary value data is sent to the group entity 141 in operation 162', the group entity 141, at operation 165, transfers the monetary value data to the contributor 138, which in turn makes a payment of the monetary value to the group entity 141. As described infra, the contributor 138 will receive convertible preferred shares of the public company 110 that are potentially worth more than its payments. As such, the group entity 141 receives the payments and the transportation activities data associated with the vehicles 131-1, 131-2, et al. of the first group of vehicles 131.

As described infra, the group entities may contract with the service platform A 112 and the service platform 116, and make commitments of certain amount of payments to the service platform A 112 and the service platform 116. Based on the payments commitments, the public company 110 can issue convertible preferred shares to the group entities.

Further, the group entity 141 may commit to provide predetermined amounts of payments and data to the service platform A 112 for a predetermined time period (e.g., 10 years). In this example, the group entity 141, at operation 168, transfers the received payments and user data of the first group of vehicles 131 to the service platform A 112 to satisfy the pavement commitments made by the group entity 141. In return, the public company 110, at operation 170, issues P1 number of convertible preferred shares of the public company 110 to the SPV entity 137. The P1 number of convertible preferred shares can be converted into C1 number of common shares of the public company 110 according to certain rules, terms, formulas, schedule, and procedures as described infra. Each user of the first group of vehicles 131 in the active mode, or the user's contributor in the passive mode, may be entitled to a portion of the convertible preferred shares based on the amount of payment and data generated by the user. At operation 172, the SPV entity 137 may entrust or contract the management company A 126 to manage the convertible preferred shares received from the public company 110.

As a number of common shares of the public company 110 are traded in the capital markets, the users and/or contributors of the first group of vehicles 131 may have immediate access to the capital markets by selling, borrowing against, taking other alike financial transactions on the number of common shares. This may allow the users and/or contributors of the first group of vehicles 131 not only to have access to the capital markets to support their needs, but also to enjoy the potential returns by the capital markets through the public company 110 as such a business and financial vehicle. Further, the value of the public company 110 partially depends on the profitability and value of the service platform A 112.

Similarly, the second group of vehicles 132 may include a predetermined number (e.g., 100, 500, 1000) of vehicles such as vehicles 132-1, 132-2, et al. The second group of vehicles 132 may be selected based on one or more rules or may be selected randomly. A user of a vehicle of the second group of vehicles 132 may own, lease, or otherwise have access to that vehicle, and may drive himself/herself for transportation. For example, the user of the vehicle 132-1 may drive that vehicle to travel from a location A to a location B. Further, in this example, the second group of vehicles 132 may join, be associated with, and be managed by a group entity 142. The group entity 142 receives the payments and the transportation activities data associated with the vehicles 132-1, 132-2, et al. of the second group of vehicles 132 at operation 166, which is similar to operation 162 and operation 164.

Further, in this example, the group entity 142 may commit to provide, at operation 169, predetermined amounts of payments and data to the service platform A 112 for a predetermined time period (e.g., 10 years). In return, the public company 110, at operation 171, issues P2 number of convertible preferred shares of the public company 110 to the group entity 142. The P2 number of convertible preferred shares can be converted into C2 number of common shares of the public company 110 according to certain rules, terms, formulas, schedule, and procedures as described infra. Each user of the second group of vehicles 132 in the active mode, or the user's contributor in the passive mode, may be entitled to a portion of the convertible preferred shares based on the amount of payment and data generated by the user. At operation 173, the group entity 142 may entrust or contract the management company A 126 to manage the convertible preferred shares received from the public company 110.

In another example, the service platform B 116 is specialized in managing user household activities and obtaining associated household activities data. As shown, the first group of housing units 133 may include a predetermined number (e.g., 100, 500, 1000) of users such as housing units 133-1, 133-2, et al. The first group of housing units 133 may be selected based on one or more rules or may be selected randomly. The first group of housing units 133 each may be a house, a condo, an apartment, etc.

The first group of housing units 133 may join, be associated with, and be managed by the group entity 143. Similarly, the second group of housing units 134 may include a predetermined number of users such as housing units 134-1, 134-2, et al. The second group of housing units 134 may join, be associated with, and be managed by the group entity 144. The second group of housing units 134 and the group entity 144 may perform operations similar to what is described infra regarding the first group of housing units 133 and the group entity 143.

As described supra, each of the first group of housing units 133 may be equipped with a household device 350. The household device 350 may determine a monetary value of renting or living in the user's housing unit for a time unit such as a day, a week, etc. That is, in this example, the household device 350 may determine a monetary value for the housing service that the user received as living in his own housing unit (as if the user is paying a hotel room). In certain configurations, the household device 350 may receive parameters, e.g., from the service platform B 116, based on which the monetary value is determined. For example, with respect to the housing unit of the housing unit 133-1, the parameters received by the associated household device 350 may indicate price information (e.g., X dollar/night) for different sizes of housing units at different housing inventory conditions (e.g., number of vacant rooms available on the market).

The household device 350 associated with a housing unit (e.g., the housing units 133-1, 133-2, et al.), may, at operation 182, report to the group entity 143 the monetary value data of the household service received by the user. In certain configurations, the household device 350 may observe certain household activities of the user such as that the user prefers a particular brand of coffee. The household device 350 may also send household activities data of the user to the group entity 143 at operation 182. The household activity data may indicate the user's preferences of goods and services at home, the user demographic, etc. In certain configurations, the household device 350 may not determine the monetary value of the transportation activity, and the group entity 143 may determine the monetary value of the household service received by the user.

Referring back to FIG. 1, each user (e.g., an owner) of the housing units 133-1, 133-2, et al. may choose to enroll either in the active mode or the passive mode, similarly to what was described supra. Using the housing unit 133-1 as an example, when the housing unit 133-1 (or its user) is in the active mode, the housing unit 133-1 (or its user) may, at operation 186, make payments of the monetary value of the household service to the group entity 143 and also allow the household device 350 to send household data to the group entity 143. Those payments and household activities are then transferred to the service platform B 116 by the group entity 143. As described infra, in return, the group entity 143 (or an SPV if used) will receive convertible preferred shares of the public company 110. The group entity 143 may convert the convertible preferred shares to common shares and, then, sell the common shares on the market. A portion of the proceeds (e.g., determined based on the payments made by the housing unit) will be distributed to the housing unit 133-1 (or its user). The distribution is potentially worth more than the payments made by the housing unit 133-1.

A housing unit (or its user) may enroll in a passive mode. Using the housing unit 133-2 as an example, when the housing unit 133-2 is in the passive mode, the household device 350 of the housing unit 133-2 may, at operation 182, send household activities data of the user to the group entity 143. A contributor 139 may, at operation 185, make payments to the group entity 143 for the housing unit 133-2, similarly to what was described supra. Those payments and household activities are then transferred to the service platform B 116 by the group entity 143. As described infra, in return, the group entity 143 (or an SPV if used) will receive convertible preferred shares of the public company 110. The group entity 143 may convert the convertible preferred shares to common shares and, then, sell the common shares on the market. A portion of the proceeds (e.g., determined based on the payments made by the contributor 139) will be distributed to the contributor 139 (or its user). The distribution is potentially worth more than the payments made by the contributor 139. The contributor 139 may further agree to pay back a portion of the received proceeds to the housing unit 133-2 (or its user).

The household device 350 of each of second group of housing units 134 may similarly report household activities and monetary values to the group entity 144. The users and/or contributors of second group of housing units 134 may similarly make payments to the group entity 144.

In particular, using the housing unit 133-1 as an example, the household device 350 of the housing unit 133-1 can detect that a first household activity has started. For example, the household device 350 may has sensors capable of detecting that a user is cleaning the housing unit 133-1. The household device 350 records a start time in response to detecting that the first household activity has been started. The household device 350 also can detect that the first household activity has ended. The household device 350 records an end time in response to detecting that the first household activity has ended. The household device 350 transmits to the group entity a message containing data associated with the first household activity that includes the start time and the end time. Based on the data, the group entity 143 can determine that the user has conduct a cleaning activity from the start time to the end time. The group entity 143 generate a monetary value for the cleaning activity.

Further, the group entity 143 can determine housing conditions of the housing unit 133-1 in accordance with a predetermined schedule. For example, the group entity 143 may determine the daily, weekly, or monthly housing demand (i.e., a housing condition) at the area of the housing unit 133-1. Based on the housing demand, the group entity 143 can determine a daily, weekly, or monthly rate for using (occupying) the housing unit 133-1.

On the other hand, the household device 350 of the housing unit 133-1 can detect a time period in which the housing unit 133-1 is occupied by the user (e.g., the owner) of the housing unit 133-1. The household device 350 records occupancy data based on the detection. The occupancy data define a first household activity. That is, the first household activity may be that the owner of the housing unit 133-1 has occupied the house for the time period. Further, the household device 350 may also include the wireless communication component similar to those of the vehicle device 250. In addition or alternatively, the household device 350 may include communication components for communicating through a wired connection (e.g., the Internet). The household device 350 detects that a communication channel between the housing unit 133-1 and the group entity 143 is open. The household device 350 transmits the occupancy data recorded in the household device 350 to the group entity 143 through the communication channel in response to the detecting that the communication channel is open. The group entity 143 determines the monetary value of the first transportation activity based on the housing conditions (e.g., rate determined as described supra) and the occupancy data (the length of the time period in which the user has occupied the housing unit 133-1).

Further, in this example, the group entity 143, at operation 188, transfers the received payments and user data of the first group of housing units 133 to the service platform B 116. Further, the group entity 143 may commit to provide predetermined amounts of payments and data to the service platform B 116 for a predetermined time period (e.g., 10 years). In return, the public company 110, at operation 190, issues P3 number of convertible preferred shares of the public company 110 to the group entity 143. (In another configuration, the group entity 143 may set up an SPV as described supra.) The P3 number of convertible preferred shares can be converted into C3 number of common shares of the public company 110 according to certain rules, terms, formulas, schedule, and procedures. Each user of the first group of housing units 133 in the active mode, or the user's contributor in the passive mode, may be entitled to a portion of the convertible preferred shares based on the amount of payment and data generated by the housing unit. At operation 192, the group entity 143 may entrust or contract the management company B 128 to manage the convertible preferred shares received from the public company 110.

As described supra, each year the group entity 143 may convert a portion of the P3 number of convertible preferred shares issued to the group entity 143 to common shares. The group entity 143 may request the management company B 128 to sell the converted common shares and may receive the proceeds from the management company B 128 at operation 195. The group entity 143 may distribute the proceeds to the users and/or contributors of the housing units 133-1, 133-2, et al.

Similarly, the group entity 144 may receive P4 number of convertible preferred shares from the public company 110. Each year the group entity 144 may convert a portion of the P4 number of convertible preferred shares issued to the group entity 144 to common shares. The group entity 144 may request the management company B 128 to sell the converted common shares and may receive the proceeds from the management company B 128. The group entity 144 may distribute the proceeds to the users and/or contributors of the housing units 134-1, 134-2, et al.

FIG. 4 is a table 400 illustrating conversion of convertible preferred shares of the public company 110 to common shares. As described supra, the service platform A 112 and the service platform B 116 receives payments from the group entities such as the group entity 141, the group entity 142, the group entity 143, and the group entity 144. Those payments may be considered as income or earnings of the service platform A 112 and the service platform B 116. Further, the service platform A 112 and the service platform B 116 receive user activity data from the group entities and deep mine the activity data to discover valuable business information. The information may generate additional income or earnings for the service platform A 112 and the service platform B 116. For example, the service platform A 112 and the service platform B 116 may provide a mechanism for trading the business information.

Further, the service platform A 112 and the service platform B 116, which may include data centers and trading centers, may be strategically placed in a tax favorable jurisdiction. For example, the tax rate applied to the service platform A 112 and the service platform B 116 may be 0%, 1%, 2%, or 5%. As such, the earnings of the service platform A 112 and the service platform B 116, which are owned by the public company 110, may be considered as income of the public company 110 and may support the market value and the stock price of the public company 110.

In this example, July 1, year 0 is the beginning of the first fiscal year. In the first fiscal year, $D_0$ number of group entities joined the service platform A 112 and the service platform 116, providing user payments and data to the service platform A 112 and the service platform 116. Further, in the first fiscal year, the projected annual after-tax earnings (PAE) of the public company 110 is $300M. Further, in the first fiscal year, the price-earnings ratio (PE) is 15.

During the first fiscal year, there are 100M (million) common shares of the public company 110 traded in a capital market. The stock price per share for the common shares averaged over a predetermined time period around July 1, year 0 is $SP_0=(300M \times 15)/100M=\$45$. The predetermined time period for averaging stock price can be 30 days, 45 days, 60 days, 90 days or any number of days. Further, the public company 110 will issue $N_{ca}$ number of convertible preferred shares to the $D_0$ group entities.

The $N_{cs}$ number of convertible preferred shares to the $D_0$ group entities are convertible to a number of common shares of the public company 110 over, for example, a period of 10 years, and is determined by (note for simplicity the number is rounded to 10 thousands):

$$N_{cs}=(PAE \times L)/SP_0=\$300M \times 10/\$45=66.67M.$$

At any given $i^{th}$ year during the 10-year conversion period, the number of common shares of the public company 110 over that year converted by the number $D_0$ group entities is no greater than $N_{cs} \times a_i$.

Referring now to FIG. 4, in one exemplary configuration, the values of $\{a_i, i=1, 2, \ldots, 10\}$ are $\{0.20, 0.15, 0.10, 0.10, 0.10, 0.10, 0.10, 0.05, 0.05, 0.05\}$. Accordingly, the maximum number of convertible preference shares can be converted each year are 13.33M, 10.00M, 6.67M, 6.67M, 6.67M, 6.67M, 6.67M, 3.34M, 3.34M, 3.34M.

In this example, the group entity 141 may be one of the $D_0$ group entities. Accordingly, each year the group entity 141 may be allowed convert its assigned portion (based on the P1 number of convertible preferred shares issued to the group entity 141) of the $N_{cs} \times a_i$ number of convertible preferred shares to common shares. As described supra, the convertible preferred shares of the group entity 141 is managed by the management company A 126. Thus, the SPV entity 137 each year may request the management company A 126 to convert its assigned portion of the convertible preferred shares to common shares, and then to sell the common shares to on the capital market. The proceeds of selling the common shares may be transferred, at operation 174, to the SPV entity 137. The SPV entity 137 may pay back the proceeds to the first group of vehicles 131. Each user in the active mode, or the contributor (e.g., the contributor 138) of the user in the passive mode, receives his portion of the proceeds, which is greater than the payment of the user to the group entity 141 in the previous year.

Further, each year the group entity 142 may similarly convert a portion of the P2 number of convertible preferred shares issued to the group entity 142 to common shares. The group entity 142 may request the management company A 126 to sell the converted common shares and may receive the proceeds from the management company A 126 at operation 175. The group entity 142 may distribute the proceeds to the vehicles 132-1, 132-2, et al.

Figure 5:
FIG. 5 is another table illustrating conversion of convertible preferred shares of a public company to common shares.

FIG. 5 is a table 500 illustrating conversion of convertible preferred shares of the public company 110 to common shares. The example used in FIG. 4 is again used. it is assumed that T=10 fiscal years, L=10, and during the first fiscal year, July 1, year 0 to June 30, year 1, there are 100M (million) ordinary shares of the public company 110 traded on a capital market with a price-earnings ratio $PE_0=15$. For a given $i^{th}$ fiscal year, the corresponding price-earnings ratio is denoted as $PE_i$.

Moreover, the values of $\{E_i\}$ in units of $M (million) are given in row 2 counting from top of the table 500 $\{E_i, i=1, 2, \ldots, 10\}=\{300, 600, 1,200, 2,400, 4,800, 9,600, 19,200, 38,400, 76,800, 153,600\}$. Note that at the year zero, i.e., prior to the first fiscal year, $E_0$ is set to be a default value as $E_0=0$.

The values of $\{\Delta E_i\}$ in units of $M (million), which are calculated by a processor of the service platform A 112 and the service platform 116 using the formula as set forth above, are given in row 3 counting from top of table 500 as $\{\Delta E_i, i=1, 2, \ldots, 10\}=\{300, 300, 600, 1,200, 2,400, 4,800, 9,600, 19,200, 38,400, 76,800\}$.

The values of $\{PE_i\}$ in units of $M (million), which are determined by the dynamics of the capital markets in reality and are assumed here for the benefits of readers to show how the model and methods of the present disclosure is practiced, are given in row 4 counting from top of table 500 as $PE_i, i=1, 2, \ldots, 10=15, 50, 20, 30, 40, 25, 28, 35, 40, 48$.

The total number of ordinary shares of the public company 110 converted for the $i_{th}$ year for the group entities, $N_{rs}^i$, may be calculated by the service platform A 112 and the service platform 116 from the following relationship:

$$N_{rs}^i=\text{Min}(N_{rs}^i(\Delta E_i, SP_i), \Sigma_{k=1}^i N_{cs}(k) \times \alpha_{i+1-k}),$$

where $N_{rs}^i$, ordinary shares of the business entity will be delivered to the group entities at the end of the $i_{th}$ year, $i=1, 2, \ldots, L$.

In general, $N_{rs}^i(\Delta E_i, SP_i)$ can be in the form of $$N_{rs}^i(\Delta E_i, SP_i)=[\Sigma_{k=1}^i C_k \Delta E_k^s/SP_k^t],$$

where $C_k$ is a constant, s is a positive number, t is a positive number, $k=1, \ldots, i$, and $i=1, 2, \ldots, L$. This type of summation provides a perfect project for a processor of the service platform A 112 and the service platform 116.

In one embodiment, $N_{rs}^i(\Delta E_i, SP_i)$ is in the form of $$N_{rs}^i(\Delta E_i, SP_i)=C_0[\Sigma_{k=1}^i \Delta E_k/SP_i],$$

wherein $C_0$ is a predetermined positive constant, and $N_{rs}^i$, is calculated from the following relationship:

$$N_{rs}^i=\text{Min}(C_0[\Sigma_{k=1}^i \Delta E_k/SP_i], \Sigma_{k=1}^i N_{cs}(k) \times \alpha_{i+1-k}), i=1, 2, \ldots, L.$$

Still referring to FIG. 5, and using $N_{rs}^i(\Delta E_i, SP_i)=C_0[\Sigma_{k=1}^i \Delta E_k/SP_k]$, one can have the following exemplary results that are calculated by a processor of the service platform A 112 and the service platform 116:

For the 1$^{st}$ fiscal year, the end of year is June 30, year 1, i=1, one has:

$E_1=\$300M, \Delta E_1=\$300M, N_t=100M \text{ shares}, PE_1=15,$
$C_0=2,$ $SP_1=PE_1 \times \text{total earning/total shares}=PE_1 \times E_1/N_t=15 \times \$300M/100M=\$45,$ which is given in the 5$^{th}$ row of table 500 counting from top for i=1 column, $N_{cs}(1)=E_1 \times L/SP_1=\$300M \times 10/\$45=66.67 \text{ (shares)},$
$\alpha_1=0.2,$ $N_{cs}(1) \times \alpha_1=66.67M \times 0.2=13.33M,$ $C_0 \Sigma_{k=1}^i \Delta E_k/SP_i(i=1)=C_0 \Delta E_1/SP_1=2 \times \$300M/\$45=13.33M,$ and accordingly, $N_{rs}^1=\text{Min}(C_0[\Sigma_{k=1}^i \Delta E_k/SP_k], N_{cs} \times \alpha_1)=\text{Min}(13.33M, 13.33M)=13.33M,$ which is listed in the second row of table 500 counting from bottom for i=1 column. Therefore, at the end of the first fiscal year, there are 13.33M ordinary shares of the public company 110 are converted from the total number of 66.67M convertible preference shares and delivered to the plurality of group entities, which can be done by physical delivery and/or electronically delivery. Thus, now the total number of ordinary shares of public company 110 in the capital market after the end of the first fiscal year is $N_t=100M$ shares+new converted shares=100M shares+ $N_r^1$s=100M+13.33M=113.33M shares.

It is noted that by choosing the constant $C_0=2$, the plurality of group entities are given implied expectation of investment return of 200% for their investment of their operating profits of $300M because at the market price of $45 per share, the total number of 13.33M ordinary shares of the public company 110 converted and delivered to them has a market value of 13.33M×$45=$600M=200%×$300M. Thus, for the chosen form of $N_{rs}^i(\Delta E_i, SP_1)=C_0[\Sigma_{k=1}^i \Delta E_k/SP_i]$, $C_0$ is the investment return multiple number for the plurality of group entities and can be chosen as any other positive number.

Similar calculations can be done for i=2, 3, 4, . . . , 10. In practice the present disclosure, these calculations and delivery of ordinary shares electronically after the calculations are executed by the service platform A 112 and the service platform 116 with its associated infrastructure.

Additional description regarding convertible preferred shares issuance and common shares conversion may be found in U.S. Pat. Nos. 7,647,253, 7,657,464, 7,716,087, 8,341,027, and 8,473,359, which are expressly incorporated by reference herein in their entirety.

Figure 6:
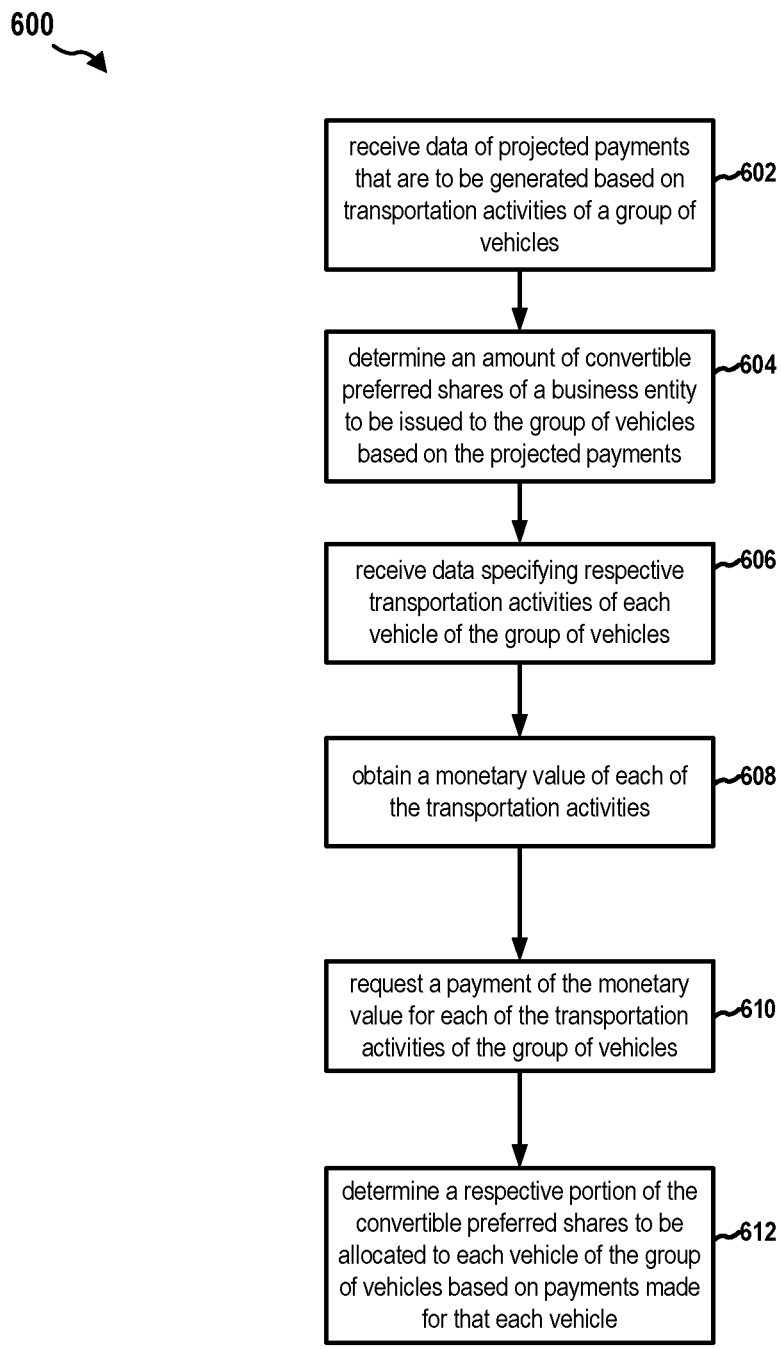
FIG. 6 is a flow chart of a method (process) for operating a network based platform.

FIG. 6 is a flow chart 600 of a method (process) for operating a network based platform. At operation 602, a platform entity (e.g., the service platform A 112) of the network based platform receives, from a first group entity (e.g., the group entity 141) managing a group of vehicles (e.g., the first group of vehicles 131), data of projected payments that are to be generated based on transportation activities of the group of vehicles. The platform entity also receives actual transportation activities generated from the group of vehicles. The payments received by platform entity are revenues of a business entity (e.g., the public company 110). At operation 604, the platform entity determines an amount of convertible preferred shares of the business entity to be issued to the group of vehicles based on the projected payments. At operation 606, the first group entity receives, from the group of vehicles, data specifying respective transportation activities of each vehicle of the group of vehicles. The data are generated on the vehicles in real time. At operation 608, the first group entity obtains a monetary value of each of the transportation activities. The monetary value is calculated based on the data specifying the each transportation activity. At operation 610, the first group entity requests a payment of the monetary value for each of the transportation activities of the group of vehicles. At operation 612, the first group entity determines a respective portion of the convertible preferred shares to be allocated to each vehicle of the group of vehicles based on payments made for that each vehicle.

In certain configurations, a measurement device of a first vehicle of the first group of vehicles detects that the first vehicle has been started. The measurement device also receives a first GNSS signal in response to detecting that the first vehicle has been started. The measurement device detects that the first vehicle has been shut off.

In certain configurations, the measurement device receives a second GNSS signal in response to detecting that the first vehicle has been stopped. The measurement device transmits to the group entity a message including data derived from the first GNSS signal and the second GNSS signal, the data derived from the first GNSS signal and the second GNSS signal defining a first transportation activity of the first vehicle. A first monetary value is generated based on the first transportation activity.

In certain configurations, the first transportation activity is that an owner of the first vehicle drives the first vehicle from a first location to a second location. In certain configurations, the first group entity receives an indication that the owner of the first vehicle has made to the first group entity a payment of the monetary value determined for the first transportation activity. In certain configurations, the first group entity receives an indication that a contributor not operating the first vehicle has made to the first group entity a payment of the monetary value determined for the first transportation activity.

In certain configurations, the measurement device detects operation conditions of the first vehicle in accordance with a predetermined schedule while the first vehicle is in operation after the first vehicle is started and before the first vehicle is stopped. The measurement device records data specifying the operation conditions of the first vehicle. The first transportation activity of the first vehicle is further defined by the data specifying the operation conditions. The measurement device detects that a communication channel between the first vehicle and the group entity is open. The measurement device transmits the data recorded to the first group entity through the communication channel in response to the determination that the communication channel is open.

In certain configurations, a plurality of group entities registers (e.g., the first group of vehicles 131 and the second group of vehicles 132) with the platform entity. A business entity (e.g., the public company 110) in control of the platform entity issues, at the beginning of a fiscal year, time $T_0$, a number $N_{cs}$ of convertible preferred shares to the plurality of group entities, wherein the $N_{cs}$ convertible preferred shares are convertible to $N_{rs}$ ordinary shares of the business entity over a period of time T counting from time $T_0$ according to the following formula: $N_{cs}=(PAE \times L)/SP_0$. The ordinary shares of the business entity are publicly traded on a capital market, the period of time T is divided into a predetermined number L of fiscal years. PAE is projected annual after-tax earnings of the business entity generated from payments made by the plurality of group entities based on transportation activities of vehicles managed by the plurality of group entities over the period of time T, and $SP_0$ is the stock price per share for the ordinary shares of the business entity averaged over a predetermined time period around time $T_0$.

The platform entity calculates the number $N_{rs}$, which is determined by the following formula:

$$N_{rs} = \Sigma_{i=1}^{L} N_{cs}(i) \times \alpha_i.$$

$\{\alpha_i\}$ satisfy the condition of $\Sigma_{i=1}^{L} \alpha_i \leq 1$, and the number of ordinary shares of the business entity over the period of time T converted from $N_{cs}$ convertible preferred shares issued to the plurality of group entities is no greater than the maximum number $N_{cs}$.

In certain configurations, the platform entity calculates the earning growth, $\Delta E_i$, of the $i^{th}$ fiscal year from the immediate prior year, the $(i-1)^{th}$ year, by the following formula:

$$\Delta E_i = E_i - E_{i-1}.$$

$E_i$ is an after-tax earning of the business entity in the $i^{th}$ fiscal year.

In certain configurations, the platform entity calculates $N_{rs}^i$, the total number of ordinary shares of the business entity converted for the $i^{th}$ year for the plurality of group entities from the following relationship:

$$N_{rs}^i = Min(N_{rs}^i(\Delta E_i, SP_i), \Sigma_{k=1}^i N_{cs}(k) \times \alpha_{i+1-k}).$$

$SP_i$ is the market stock price per share for the ordinary shares of the business entity averaged over a predetermined time period in the $i^{th}$ year.

Figure 7:
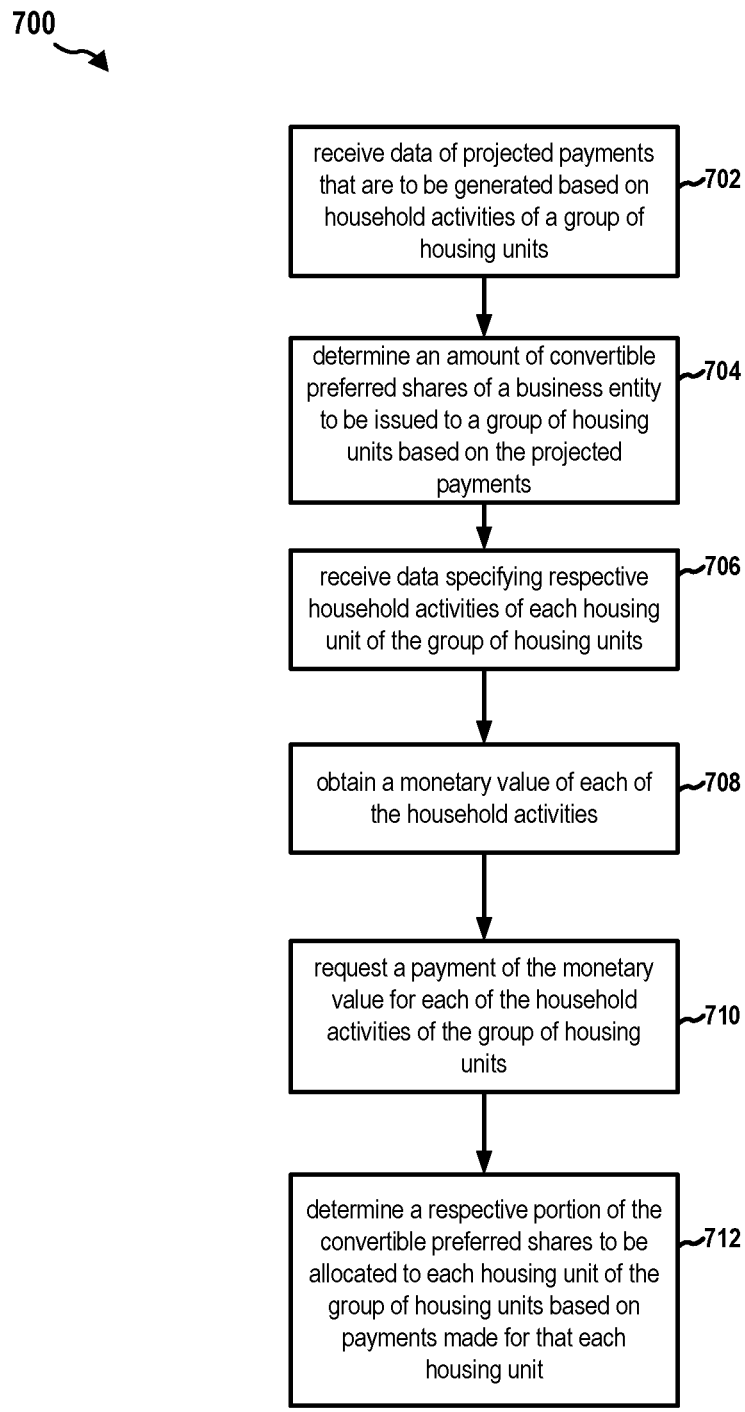
FIG. 7 is a flow chart of another method (process) for operating a network based platform.

FIG. 7 is a flow chart 700 of a method (process) for operating a network based platform. At operation 702, a platform entity (e.g., the service platform B 116) of the network based platform receives, from a first group entity (e.g., the group entity 143) managing a group of housing units (e.g., the first group of housing units 133), data of projected payments that are to be generated based on household activities of the group of housing units. The platform entity also receives actual household activities generated from the group of housing units. The payments received by platform entity are revenues of a business entity (e.g., the public company 110). At operation 704, the platform entity determines an amount of convertible preferred shares of the business entity to be issued to the group of housing units based on the projected payments. At operation 706, the first group entity receives, from the group of housing units, data specifying respective household activities of each housing unit of the group of housing units. The data are generated on the housing units in real time. At operation 708, the first group entity obtains a monetary value of each of the household activities. The monetary value is calculated based on the data specifying the each household activity. At operation 710, the first group entity requests a payment of the monetary value for each of the household activities of the group of housing units. At operation 712, the first group entity determines a respective portion of the convertible preferred shares to be allocated to each housing unit of the group of housing units based on payments made for that each housing unit.

In certain configurations, a measurement device of first housing unit of the first group of housing units detects that a first household activity has started. The measurement device records a start time in response to detecting that the first household activity has been started. The measurement device detects that the first household activity has ended. The measurement device records an end time in response to detecting that the first household activity has ended. The measurement device transmits to the group entity a message containing data associated with the first household activity that includes the start time and the end time. The data define the first household activity. A first monetary value is generated based on the first household activity.

In certain configurations, the group entity of the first housing unit determines housing conditions of the first housing unit in accordance with a predetermined schedule. The measurement device detects a time period in which the first housing unit is occupied by a user of the first housing unit. The measurement device records occupancy data based on the detection, wherein the occupancy data define a first household activity. The measurement device detects that a communication channel between the first housing unit and the group entity is open. The measurement device transmits the occupancy data recorded in the measurement device to the first group entity through the communication channel in response to the detecting that the communication channel is open. The monetary value of the first transportation activity is determined based on the housing conditions and the occupancy data.

In certain configurations, the first household activity is that an owner of the first housing unit occupies the first vehicle during the time period. In certain configurations, the first group entity receives an indication that the owner of the first vehicle has made to the first group entity a payment of the monetary value determined for the first household activity. In certain configurations, the first group entity receives an indication that a contributor not occupying the first vehicle has made to the first group entity a payment of the monetary value determined for the first household activity.

In certain configurations, a plurality of group entities registers (e.g., the first group of housing units 133 and the second group of housing units 134) with the platform entity. A business entity (e.g., the public company 110) in control of the platform entity issues, at the beginning of a fiscal year, time $T_0$, a number $N_{cs}$ of convertible preferred shares to the plurality of group entities, wherein the $N_{cs}$ convertible preferred shares are convertible to $N_{rs}$ ordinary shares of the business entity over a period of time T counting from time $T_0$ according to the following formula: $N_{cs}=(PAE \times L)/SP_0$. The ordinary shares of the business entity are publicly traded on a capital market, the period of time T is divided into a predetermined number L of fiscal years. PAE is projected annual after-tax earnings of the business entity generated from payments made by the plurality of group entities based on transportation activities of vehicles managed by the plurality of group entities over the period of time T, and $SP_0$ is the stock price per share for the ordinary shares of the business entity averaged over a predetermined time period around time $T_0$.

The platform entity calculates the number $N_{rs}$, which is determined by the following formula:

$$N_{rs}=\Sigma_{i=1}^{L}N_{cs}(i) \times \alpha_i.$$

$\{\alpha_i\}$ satisfy the condition of $\Sigma_{i=1}^{L}\alpha_i \leq 1$, and the number of ordinary shares of the business entity over the period of time T converted from $N_{cs}$ convertible preferred shares issued to the plurality of group entities is no greater than the maximum number $N_{rs}$.

In certain configurations, the platform entity calculates the earning growth, $\Delta E_i$, of the $i^{th}$ fiscal year from the immediate prior year, the $(i-1)^{th}$ year, by the following formula:

$$\Delta E_i = E_i - E_{i-1}.$$

$E_i$ is an after-tax earning of the business entity in the $i^{th}$ fiscal year.

In certain configurations, the platform entity calculates $N_{rs}^{i}$, the total number of ordinary shares of the business entity converted for the $i^{th}$ year for the plurality of group entities from the following relationship:

$$N_{rs}^{i}=\text{Min}(N_{rs}^{i}(\Delta E_i, SP_i), \Sigma_{k=1}^{i}N_{cs}(k) \times \alpha_{i+1-k}).$$

$SP_i$ is the market stock price per share for the ordinary shares of the business entity averaged over a predetermined time period in the $i^{th}$ year.

Figure 8:
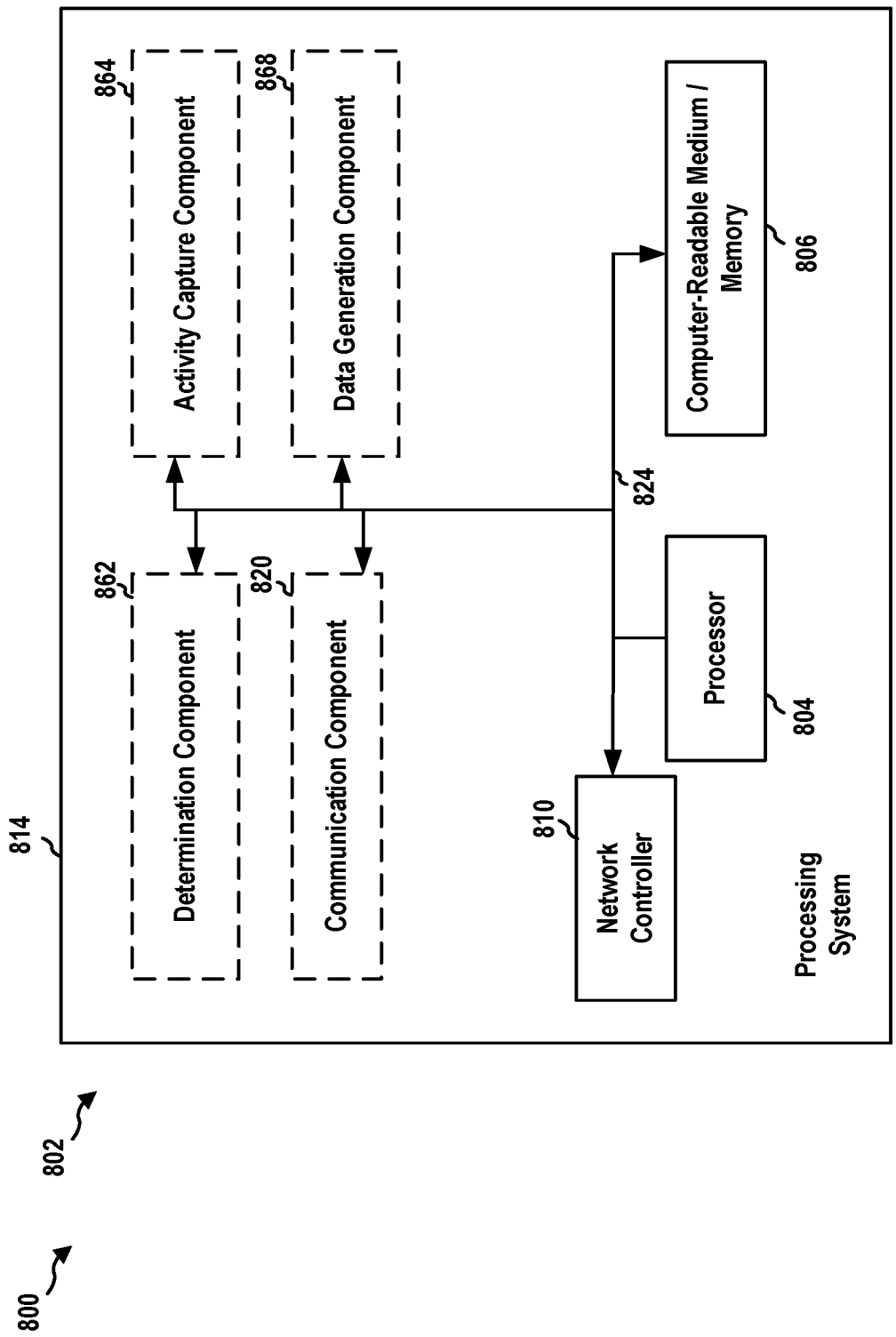
FIG. 8 is a diagram illustrating an example of a hardware implementation for an apparatus employing a processing system.

FIG. 8 is a diagram 800 illustrating an example of a hardware implementation for an apparatus 802 employing a processing system 814. The apparatus 802 may be implemented to function as the vehicle device 250 and/or the household device 350. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the determination component 862, the activity capture component 864, the communication component 820, the data generation component 868, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a network controller 810. The network controller 810 provides a means for communicating with various other apparatus over a network. The network controller 810 receives a signal from the network, extracts information from the received signal, and provides the extracted information to the processing system 814, specifically the communication component 820. In addition, the network controller 810 receives information from the processing system 814, specifically the communication component 820, and based on the received information, generates a signal to be sent to the network. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system further includes at least one of the determination component 862, the activity capture component 864, the communication component 820, the data generation component 868. The components may be software components running in the processor 804, resident/stored in the computer readable medium/memory 806, one or more hardware components coupled to the processor 804, or some combination thereof.

The activity capture component 864 may capture a user's transportation activities or household activities. The data generation component 868 may generate user activity data based on the activities. The determination component 862 may determine the monetary value of the activities. The communication component 820 may establish a communication channel with a group entity.

The apparatus 802 may be configured to include means for performing each of the operations of the vehicle device 250 and/or the household device 350 described supra referring to FIG. 1. The aforementioned means may be one or more of the aforementioned components of the apparatus 802 configured to perform the functions recited by the aforementioned means.

Figure 9:
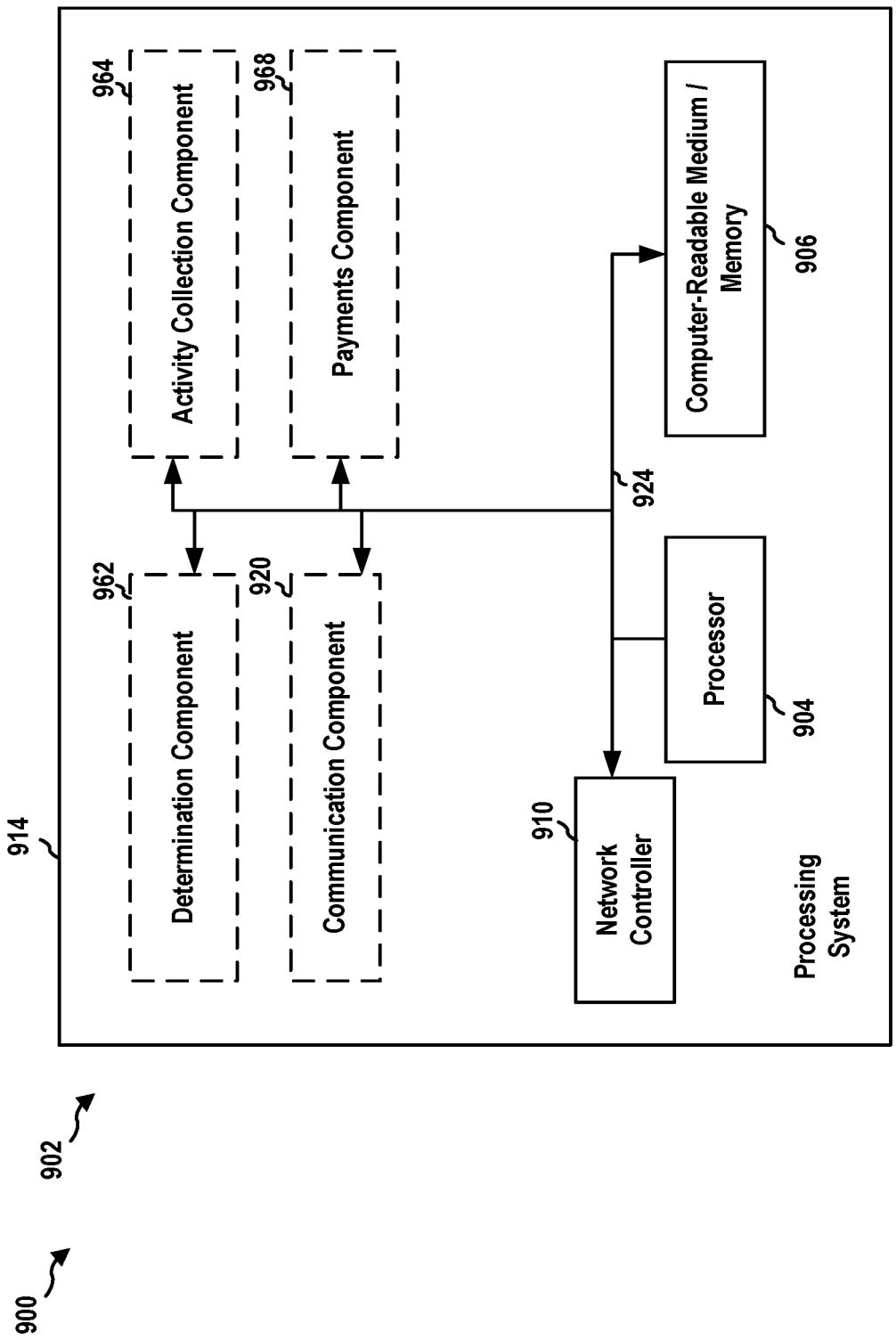
FIG. 9 is a diagram illustrating an example of a hardware implementation for another apparatus employing a processing system.

FIG. 9 is a diagram 900 illustrating an example of a hardware implementation for an apparatus 902 employing a processing system 914. The apparatus 902 may be implemented to function as the group entity 141, group entity 142, group entity 143 and/or group entity 144. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the determination component 962, the activity collection component 964, the communication component 920, the payments component 968, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a network controller 910. The network controller 910 provides a means for communicating with various other apparatus over a network. The network controller 910 receives a signal from the network, extracts information from the received signal, and provides the extracted information to the processing system 914, specifically the communication component 920. In addition, the network controller 910 receives information from the processing system 914, specifically the communication component 920, and based on the received information, generates a signal to be sent to the network. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system further includes at least one of the determination component 962, the activity collection component 964, the communication component 920, the payments component 968. The components may be software components running in the processor 904, resident/stored in the computer readable medium/memory 906, one or more hardware components coupled to the processor 904, or some combination thereof.

The activity collection component 964 may collect users' transportation activities or household activities. The determination component 962 may determine the monetary value of the activities. The payments component 968 can further receives payments from users and/or contributors and make payments to the platform entity. The communication component 920 may establish a communication channel with a group entity.

The apparatus 902 may be configured to include means for performing each of the operations of the group entity described supra referring to FIGS. 6-7. The aforementioned means may be one or more of the aforementioned components of the apparatus 902 configured to perform the functions recited by the aforementioned means.

Figure 10:
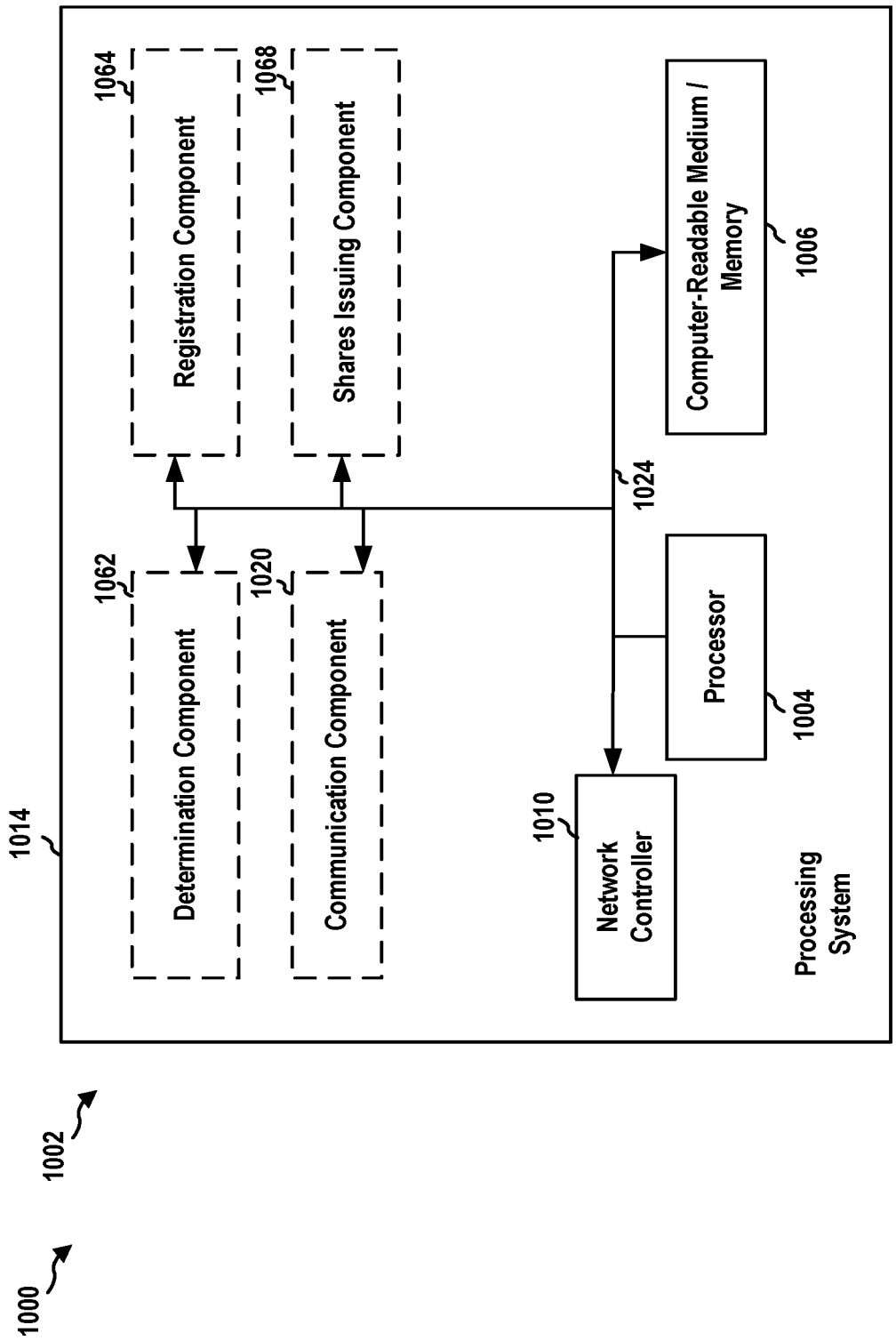
FIG. 10 is a diagram illustrating an example of a hardware implementation for yet another apparatus employing a processing system.

FIG. 10 is a diagram 1000 illustrating an example of a hardware implementation for an apparatus 1002 employing a processing system 1014. The apparatus 1002 may be implemented to function as the service platform A 112 and/or service platform B 116. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the determination component 1062, the registration component 1064, the communication component 1020, the share issuing component 1068, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a network controller 1010. The network controller 1010 provides a means for communicating with various other apparatus over a network. The network controller 1010 receives a signal from the network, extracts information from the received signal, and provides the extracted information to the processing system 1014, specifically the communication component 1020. In addition, the network controller 1010 receives information from the processing system 1014, specifically the communication component 1020, and based on the received information, generates a signal to be sent to the network. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system further includes at least one of the determination component 1062, the registration component 1064, the communication component 1020, the share issuing component 1068. The components may be software components running in the processor 1004, resident/stored in the computer readable medium/memory 1006, one or more hardware components coupled to the processor 1004, or some combination thereof.

The registration component 1064 may register group entities with the platform. The share issuing component 1068 may issue convertible preferred shares to the group entities. The determination component 1062 may determine conversion of convertible preferred shares to common shares. The communication component 1020 may establish a communication channel with a group entity.

The apparatus 1002 may be configured to include means for performing each of the operations of the platform entity described supra referring to FIGS. 6-7. The aforementioned means may be one or more of the aforementioned components of the apparatus 1002 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a network based platform, comprising:
    receiving, at a platform entity of the network based platform and from a first group entity managing a group of vehicles, data of projected payments that are to be generated based on transportation activities of the group of vehicles;
    determining, at the platform entity, an amount of convertible preferred shares of a business entity to be issued to the group of vehicles based on the projected payments;
    receiving, at the first group entity and from the group of vehicles, data specifying respective transportation activities of each vehicle of the group of vehicles, the data being generated on the vehicles in real time;
    obtaining, at the first group entity, a monetary value of each of the transportation activities, the monetary value being calculated based on the data specifying the each transportation activity;
    requesting, at the first group entity, a payment of the monetary value for each of the transportation activities of the group of vehicles;
    determining, at the first group entity, a respective portion of the convertible preferred shares to be allocated to each vehicle of the group of vehicles based on payments made for that each vehicle;
    detecting, at a measurement device of a first vehicle of the first group of vehicles, that the first vehicle has been started;
    receiving, at the measurement device, a first GNSS signal in response to detecting that the first vehicle has been started;
    detecting, at the measurement device, that the first vehicle has been shut off;
    receiving, at the measurement device, a second GNSS signal in response to detecting that the first vehicle has been stopped; and
    transmitting, from the measurement device to the group entity, a message including data derived from the first GNSS signal and the second GNSS signal, the data derived from the first GNSS signal and the second GNSS signal defining a first transportation activity of the first vehicle, wherein a first monetary value is generated based on the first transportation activity.

2. The method of claim 1, wherein the first transportation activity is that an owner of the first vehicle drives the first vehicle from a first location to a second location.

3. The method of claim 2, further comprising:
    receiving, at the first group entity, an indication that the owner of the first vehicle has made to the first group entity a payment of the monetary value determined for the first transportation activity.

4. The method of claim 2, further comprising:
    receiving, at the first group entity, an indication that a contributor not operating the first vehicle has made to the first group entity a payment of the monetary value determined for the first transportation activity.

5. The method of claim 1, further comprising:
    detecting, at the measurement device, operation conditions of the first vehicle in accordance with a predetermined schedule while the first vehicle is in operation after the first vehicle is started and before the first vehicle is stopped;
    recording, at the measurement device, data specifying the operation conditions of the first vehicle, wherein the first transportation activity of the first vehicle is further defined by the data specifying the operation conditions;
    detecting, at the measurement device, that a communication channel between the first vehicle and the group entity is open;
    transmitting the data recorded at the measurement device to the first group entity through the communication channel in response to the determination that the communication channel is open.

6. The method of claim 1, further comprising:
    registering a plurality of group entities with the platform entity; and issuing by a business entity in control of the platform entity at the beginning of a fiscal year, time $T_0$, a number $N_{cs}$ of convertible preferred shares to the plurality of group entities, wherein the $N_{cs}$ convertible preferred shares are convertible to $N_{rs}$ ordinary shares of the business entity over a period of time T counting from time $T_0$ according to the following formula: Ncs=(PAE×L)/$SP_0$, wherein the ordinary shares of the business entity are publicly traded on a capital market, the period of time T is divided into a predetermined number L of fiscal years, PAE is projected annual after-tax earnings of the business entity generated from payments made by the plurality of group entities based on transportation activities of vehicles managed by the plurality of group entities over the period of time T, and $SP_0$ is the stock price per share for the ordinary shares of the business entity averaged over a predetermined time period around time $T_0$.

7. The method of claim 6, further comprising:
calculating the number $N_{rs}$, which is determined by the following formula:

$$N_{rs}=\Sigma_{i=1}^{L} N_{cs}(i) \times \alpha_i$$

wherein $\{\alpha_i\}$ satisfy the condition of $\Sigma_{i=1}^{L} \alpha_i \leq 1$, and the number of ordinary shares of the business entity over the period of time T converted from $N_{cs}$ convertible preferred shares issued to the plurality of group entities is no greater than the maximum number $N_{rs}$.

8. The method of claim 6, further comprising:
calculating the earning growth, $\Delta E_i$, of the $i^{th}$ fiscal year from the immediate prior year, the $(i-1)^{th}$ year, by the following formula:

$$\Delta E_i = E_i - E_{i-1};$$

wherein $E_i$ is an after-tax earning of the business entity in the $i^{th}$ fiscal year.

9. The method of claim 6, further comprising:
calculating $N_{rs}^i$, the total number of ordinary shares of the business entity converted for the $i^{th}$ year for the plurality of group entities from the following relationship:

$$N_{rs}^i = \text{Min}(N_{rs}^i(\Delta E_i, SP_i), \Sigma_{k=1}^{i} N_{cs}(k) \times \alpha_{i+1-k}),$$

wherein $SP_i$ is the market stock price per share for the ordinary shares of the business entity averaged over a predetermined time period in the $i^{th}$ year.

* * * * *